United States Patent [19]

Kessler de Vivie et al.

[11] Patent Number: 4,986,246
[45] Date of Patent: Jan. 22, 1991

[54] VALVE FOR THE METERED ADMIXTURE OF VOLATILIZED FUEL TO THE FUEL-AIR MIXTURE OF AN INTERNAL COMBUSTION ENGINE

[75] Inventors: Achill Kessler de Vivie, Sindelfingen; Ernst Linder, Muehlacker; Helmut Rembold, Stuttgart; Manfred Ruoff, Moeglingen; Walter Teegen, Waiblingen-Hohenacker, all of Fed. Rep. of Germany

[73] Assignee: Robert Bosch GmbH, Struttgart, Fed. Rep. of Germany

[21] Appl. No.: 424,780

[22] Filed: Oct. 20, 1989

[30] Foreign Application Priority Data

Dec. 31, 1988 [DE] Fed. Rep. of Germany ....... 3844453

[51] Int. Cl.$^5$ ............................................. F02M 39/04
[52] U.S. Cl. .................................... 123/520; 123/519; 251/129.21
[58] Field of Search ............... 123/458, 516, 518, 519, 123/520, 521; 251/129.16, 129.05, 129.21, 129.22, 129.17, 129.18

[56] References Cited

U.S. PATENT DOCUMENTS

| 3,961,644 | 6/1976 | Eckert | 251/129.21 |
| 4,132,194 | 1/1979 | Spito | 123/458 |
| 4,304,391 | 12/1981 | Yamaguchi | 251/129.17 |
| 4,356,980 | 11/1982 | Krauss | 251/129.21 |
| 4,577,607 | 3/1986 | Nishio | 123/516 |
| 4,614,327 | 9/1986 | Valbjorn | 251/129.21 |
| 4,628,887 | 12/1986 | Mitchell | 123/520 |
| 4,655,249 | 4/1987 | Livet | 251/129.21 |
| 4,700,682 | 10/1987 | Ota | 123/519 |
| 4,703,739 | 11/1987 | Yogo | 123/520 |
| 4,732,362 | 3/1988 | Morioka | 251/129.18 |
| 4,763,635 | 8/1988 | Ballhause et al. | |
| 4,805,871 | 2/1989 | Nakamura | 251/129.17 |
| 4,830,332 | 5/1989 | Miura | 251/129.17 |
| 4,875,742 | 10/1989 | Hawker | 251/129.16 |
| 4,901,702 | 2/1990 | Beicht | 123/458 |

FOREIGN PATENT DOCUMENTS

| 0123068 | 9/1980 | Japan | 251/129.17 |
| 0529328 | 12/1976 | U.S.S.R. | 251/129.21 |

Primary Examiner—Carl Stuart Miller
Attorney, Agent, or Firm—Edwin E. Greigg

[57] ABSTRACT

A tank bleeder valve for the metered admixture of volatilized fuel to the fuel-air mixture of an internal combustion engine has a valve housing with inflow and outflow necks, between which an electromagnetically actuatable seat valve is disposed. The inflow neck communicates with the vent neck of a fuel tank, and the outflow neck communicates with the engine intake manifold. To prevent dieseling of the engine after the ignition is switched off, the seat valve is embodied such that it is very tightly closed when there is no current. To this end, the valve opening of the seat valve is embodied as an annular gap, coaxially surrounded on the inside and outside by a valve seat in the form of an annular double seat. The valve element of the seat valve is embodied as an annular disk of magnetically conductive material, which is loaded with a closing force acting in the closing direction of the seat valve. The annular disk simultaneously acts as the armature of the electromagnet.

24 Claims, 3 Drawing Sheets

VALVE FOR THE METERED ADMIXTURE OF VOLATILIZED FUEL TO THE FUEL-AIR MIXTURE OF AN INTERNAL COMBUSTION ENGINE

BACKGROUND OF THE INVENTION

The invention relates to a valve for the metered admixture of fuel, volatilized from the fuel tank of an internal combustion engine, to a fuel-air mixture supplied to the engine via an intake manifold.

Under environmental protection laws in some countries, fuel that has volatilized in the fuel tank, that is, gasoline vapor, must not be vented into the open but instead must be burned by being fed into the engine. To this end, the vent neck of the fuel tank is connected to a reservoir filled with activated charcoal, which holds the volatilized fuel while the engine is stopped and then releases it again when the engine is running. To accomplish this, the reservoir communicates via an intake line with the engine intake manifold, where the fuel vapor is added to the fuel-air mixture. Because this can increase the exhaust emissions, the fuel vapor can be admixed only in certain operating states of the engine and in certain quantities. This is accomplished with the so-called tank bleeder valve, which is disposed in the intake line between the reservoir and the intake manifold and is opened and closed, preferably in clocked fashion, by an electronic control system as a function of the engine operating state and of the exhaust emissions measured by a lambda sensor.

In a known tank bleeder valve of this type (German patent document No. DE 35 19 292 A1), the valve closing element is embodied such that it opens the valve opening when the electromagnet is without current; that is, the seat valve is open when there is no current. Because of the opened seat valve, there is communication between the intake manifold and the reservoir holding the fuel vapor, which leads to "dieseling", that is, to the engine's running after its ignition is shut off.

OBJECT AND SUMMARY OF THE INVENTION

The tank bleeder valve according to the invention as defined has the advantage over the prior art that because of the design according to the invention, the seat valve is closed when there is no current, and the communication between the activated charcoal reservoir and the engine intake manifold is always closed when the engine is shut off. This prevents dieseling. Because of the double seat, the requisite flow cross section is attained even at a short valve stroke. The dual function of the annular disk, both as a valve element of the seat valve and as a movable armature for the electromagnet, makes small movable masses and hence short switching times of the seat valve possible. As a result, by varying the duty cycle of the electromagnet that is triggered in clocked fashion, the metering cross section can be adjusted between 0.08 and 6 mm$^2$. In the ON state, by measuring the throughput at a defined prevailing pressure, the valve stroke can be adjusted very accurately by pressing on the magnet cup or housing.

Further developments of and improvements to the tank bleeder valve defined herein are also possible.

In one embodiment of the invention, the valve seat is disposed in one piece with the housing part having the inflow neck. This means that there are fewer parts to be assembled, although machining of the housing part and valve seat is somewhat more complicated.

In a preferred embodiment of the invention, the annular gap and the double seat of the valve are therefore disposed on an intermediate ring held attached to the housing in the valve chamber. This provides the option of causing the differential pressure in the double seat of the valve to act in the valve opening or the valve closing direction selectively. In the latter case, the tightness of the seat valve increases in proportion to the pressure, and the closing time of the seat valve also becomes shorter. This is important for attaining a minimum metering cross section at a large pressure difference during engine idling. The opening time of the seat valve does become longer in that case, but since the increased time is primarily during the dead time, the metering time window remains unaffected.

If the tank bleeder valve according to the invention is to be used with supercharged engines, then with a differential pressure at the valve seat acting in the closing direction, a shutoff valve or check valve is necessary. In a further feature of the invention, this is simple to provide on the intermediate ring, in that the annular gap widens conically toward the back, remote from the double seat, of the intermediate ring, and on the back is surrounded, again on both sides, by a sealing seat, and that an annular closing element that with it forms a check valve rests on the sealing seat under the influence of a restoring spring.

By using this kind of intermediate ring having the annular gap and the double seat of the valve, by fastening the annular disk on a diaphragm spring and by closing the magnet circuit with an intermediate disk that covers the magnet cup as far as the cup core, it is possible to combine all these components into a unit, fastened axially at the edge via the two-piece plastic valve housing. As a result, plastic flow in the plastic parts has no effect on such aspects of valve function as tightness and switching time fluctuations resulting from a variation in the valve stroke.

It is advantageous to use the diaphragm spring as both an armature and a closing element, as provided in another feature of the invention. To this end, the diaphragm spring must have both good magnetic properties and good spring steel properties. The diaphragm spring is therefore preferably made from cobalt iron. To increase wear resistance at the valve double seat and to avoid magnetic seizing, the diaphragm spring is provided with a nickel coating. If an additional annular disk is used as the armature, either it can be secured to the diaphragm spring by gluing or welding or it may be integral with the diaphragm spring; to that end, the diaphragm spring is provided with a greater thickness in the vicinity of the double seat of the valve. A loose side-by-side arrangement of the annular disk and the diaphragm is also possible, with a radial fixation of the annular disk by localized segments bent upward from the diaphragm spring, or by a guide collar on the valve double seat.

If the intermediate ring is disposed in the valve housing in such a way that the valve double seat faces toward the outflow neck, then in a further feature of the invention a valve element stroke adjustment as a function of the differential pressure at the valve seat is attainable by securing a bellows with one face end on the front side of the intermediate ring remote from the valve double seat, and with the other face end on the inside bottom of a cup surrounding the bellows and radially spaced apart from it, with the fastening at each end being pressure-tight and the rim of the cup merging with an annular collar protruding past the annular gap; on its front side, the intermediate ring has a sealing seat surrounding the annular gap in the intermediate ring on the inside and outside, with the sealing seat cooperating with the annular collar of the cup; this collar functions as the closing element and has a throttle bore in its region encompassed by the bellows.

With this kind of stroke adaptation and the resultant variation in the clocked opening of the flow cross section, greater accuracy is attained in the control of small throughput quantities with a large pressure difference at the valve seat (engine idling), and the extremely short switching times that were needed for this purpose with a short valve stroke are no longer necessary. The electromagnet can be smaller and lighter in weight. Bores in the annular collar determine the throughput during engine idling. The throttle bore in the intermediate ring provides sufficient damping to avoid impermissible vibration of the bellows during the adjustment. Because of the rigidity and stroke of the bellows and because of the diameter of the bores in the annular collar, versatile adaptation to the required operating conditions of the engine is possible.

A discontinuous adjustment of the bellows is attained in a further feature of the invention by providing the bellows with a stroke stop that has a sealing seat on which the cup bottom rests in such a way as to provide effective closing, and by providing a throttle bore in the cup bottom inside the region covered by the valve seat. In this version, tolerances in the spring characteristic of the bellows have not influence on the flow cross section. To recognize the switchover point, the output signal of the exhaust gas or lambda sensor is evaluated. Since the switchover takes place discontinuously, a discontinuous change in the output signal also occurs, which can be detected without further effort.

The invention will be better understood and further objects and advantages thereof will become more apparent from the ensuing detailed description of preferred embodiments taken in conjunction with the drawings.

DESCRIPTION OF THE PREFERRED EMBODIMENT

Figure 1:
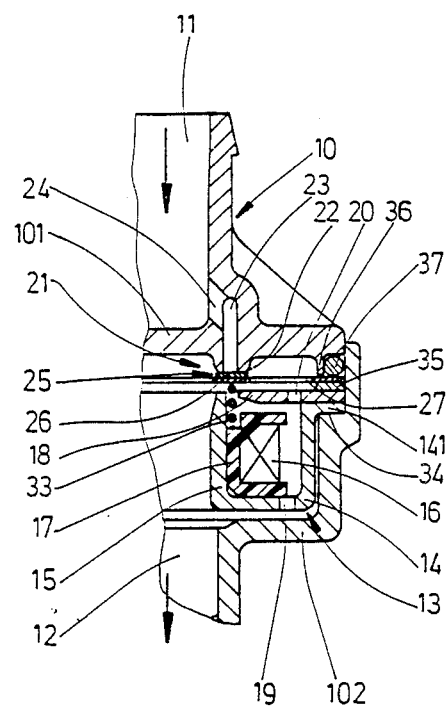
FIG. 1 is a fragmentary longitudinal section through a tank bleeder valve.

The valve shown in a fragmentary longitudinal section in FIG. 1 for metered admixture of fuel, volatilized out of a fuel tank of an internal combustion engine, to a fuel-air mixture supplied to the engine via an intake manifold, hereinafter called a tank bleeder valve, is used in a system for feeding volatilized fuel to an engine as described in German patent document No. DE 35 19 292 A1. The tank bleeder valve has a two-piece valve housing 10 with a cup-shaped housing part 102 and a cap-shaped housing part 101. The housing part 101 has an inflow neck 11 for connection to a vent neck of the fuel tank or to a reservoir, connected to its outlet side and filled with activated charcoal, for the volatilized fuel, while the housing part 102 has an outflow neck 12 for connection to the engine intake manifold. The inflow and outflow necks 11 and 12 are disposed coaxially in the respective housing parts 101 and 102 and are in alignment with one another. An electromagnet 13 is disposed in the interior of the cup-shaped housing part 102; in a known manner, it has a magnet cup 14 with a coaxial, hollow-cylindrical cup core 15, offstanding from the cup bottom, and a cylindrical exciter coil 16 that is seated on a coil holder 17 and rests in the magnet cup 14, surrounding the core 15. On its rim, the magnet cup 14 has an integral annular flange 141 protruding outward. Resting on this annular flange 141 is an intermediate disk 18, which covers the open top of the cup as far as the core 15 and surrounds this core, with radial spacing from it, at its free end. Bores 19, 20 for the flow cross section are provided in the bottom of the magnet cup 14 and in the intermediate disk 18.

Figure 2:
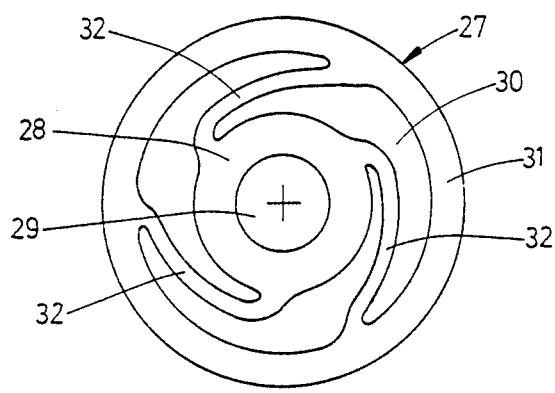
FIG. 2 is a plan view of a diaphragm spring in the tank bleeder valve of FIG. 1.

The electromagnet 13 serves to effect clocked switching of the seat valve 21 disposed between the inflow neck 11 and the outflow neck 12. The seat valve 21 has a double valve seat 22, which is disposed on the housing part 101, integrally with it, coaxially with the inflow neck 11. The double valve seat 22 coaxially surrounds an annular gap 23 on the outside and inside. The annular gap 23, extending in the form of a hollow cylinder in the housing part 101, communicates with the inflow neck 11 via slanted bores 24. A valve element 25 in the form of an annular disk 26 cooperates with the double valve seat 22. The annular disk 26 is secured to a diaphragm spring 27, which is shown in plan view in FIG. 2. As can be seen from the drawing, the diaphragm spring 27 has air flow openings, in the form of a circular opening 29 inside the support face 28 for the annular disk 26 and in the form of an annular opening 30, interrupted by resilient webs 32, between the support face 28 and the outer rim region 31. The arrangement of the annular gap 23 with the double valve seat 22 and of the annular disk 26 seated on the seat 22 is designed such that the annular disk 26 covers both the end face of the cup core 15 and the region of the rim of the intermediate disk 18 oriented toward the cup core 15. The annular disk 26 is pressed onto the double valve seat 22 by a cylindrical compression spring 33. To this end, the cylindrical compression spring 33 passes through the open space between the cup core 15 and the intermediate disk 18 and is supported on one end on the coil holder 17 and on the other on the diaphragm spring 27. The annular disk 26 is made of magnetically conductive material, and it not only functions to close the valve but also acts as the armature of the electromagnet 13.

For retaining the electromagnet 13, the intermediate disk 18 and the diaphragm spring 27 on the housing, an annular shoulder 34, on which the magnet cup 14 rests with its annular flange 141, is provided in the cup-shaped housing part 102. The intermediate disk 18 rests on the annular flange 141, and via an interposed spacer disk 35 the face end of the diaphragm spring 27 rests on the intermediate disk 18. This unit is firmly clamped to the annular shoulder 34 by a clamping shoulder 36, via an interposed elastic element 37 such as an O-ring, wave washer or cup spring. The clamping is effected after the insertion of the caplike housing part 101 into the cup-shaped housing part 102 by ultrasonic welding. The valve stroke, that is, the stroke of the annular disk 26, can be adjusted by axial displacement of the caplike housing part 101 prior to the welding. In the same manner, the elastic element 37 may be disposed between the annular flange 141 and the annular shoulder 34. In that case, as before, the valve stroke is once again determined by the thickness of the spacer disk 35. With the engine on and at a defined prevailing pressure, the valve stroke can additionally be adjusted via the measurement of the throughput.

It is also possible to dispose the annular disk 26 on the other side of the diaphragm spring 27, remote from the double valve seat 22. In that case, the diaphragm spring 27 is made of magnetic steel, and it serves in addition as a magnetic conductor. The annular disk 26 need not be secured to the diaphragm spring 27. It may be made integral with the diaphragm spring by applying a suitable manufacturing process to make the diaphragm spring 27 thicker in the vicinity of the face 28. In that case, a remanent air gap is defined via an anti-magnetic coating. The annular disk 26 may equally well rest loosely on the diaphragm spring 27. In that case, for radially fixing the annular disk 26 on the diaphragm spring 27, segments are locally bent upward, preventing displacement past the stroke. A guide collar on the housing part 101 can serve the same purpose.

Flow guidance following the double valve seat 22 when the seat valve 21 is open is effected on the one hand via the interior of the cup core 15 and on the other via the bores 19 and 20 in the magnet cup 14 and in the intermediate disk 18. This simultaneously cools the exciter coil 16.

Figure 3:
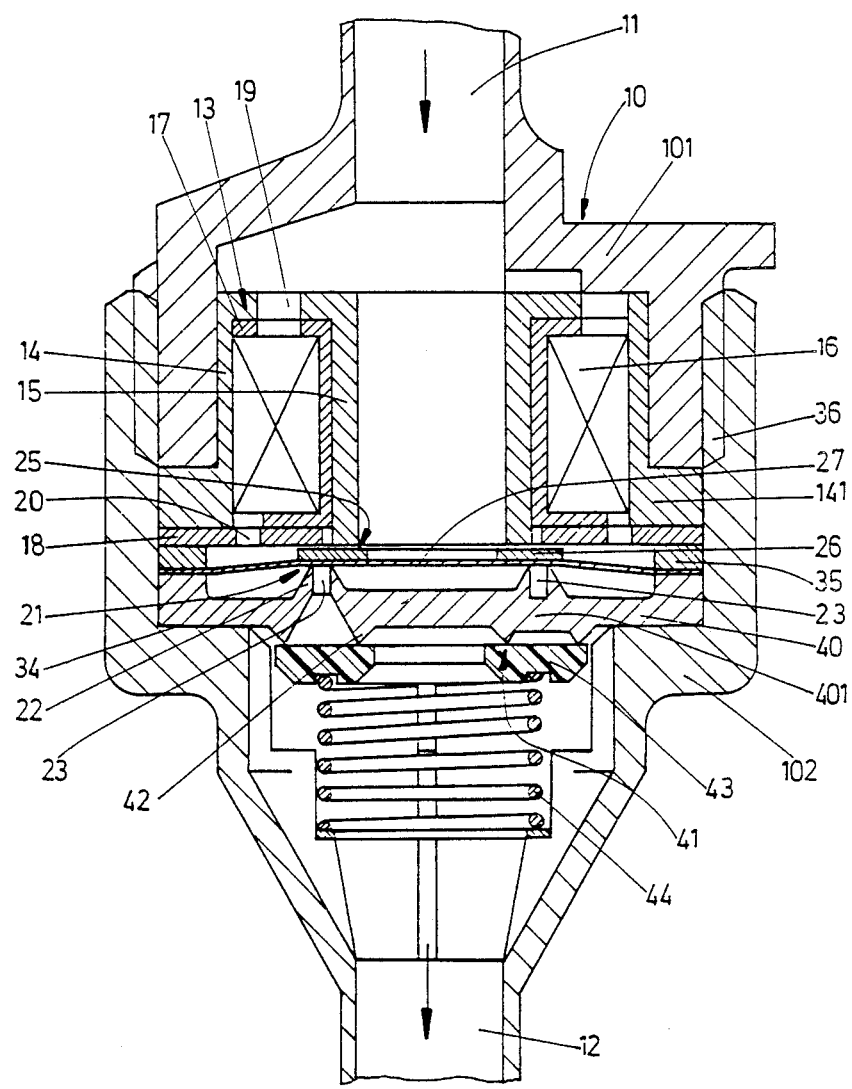
FIG. 3 is a longitudinal section through a tank bleeder valve in a second exemplary embodiment.

The tank bleeder valve shown in longitudinal section in FIG. 3 in a further exemplary embodiment is modified from that described in conjunction with FIG. 1 in that the annular gap 23 and double valve seat 22 is no longer disposed on the caplike housing part 101 but rather in an intermediate ring 40, which together with the unit comprising the annular flange 141 of the magnet cup 14, the intermediate disk 18, the spacer disk 35 and the diaphragm spring 37 is clamped to the housing between the annular shoulder 34 of the cup-shaped housing part 102 and the clamping shoulder 36 of the caplike housing part 101. To insure that the intermediate ring 40 holds together, the annular gap 23 is locally interrupted by webs 401 that connect the inner and outer parts (in terms of the annular gap 23) of the intermediate ring 40 to one another. The intermediate ring 40, which in view of wear is made of metal, is disposed such that the double valve seat 22 faces toward the inflow neck 11 in the caplike housing part 101. As a result, the flow direction in the valve is in the closing direction of the valve element 25. The sealing force thus increases in proportion to the pressure, and the closing times become shorter. The annular disk 26 forming the valve element 26 is at the same time a magnet armature and is disposed on the side of the diaphragm spring 27 remote from the double valve seat 22. Thus the diaphragm spring 27 rests directly on the sealing lips of the metal double valve seat 22 and serves as a sealing element. It is also possible to dispense with the annular disk 26 entirely and to use the diaphragm spring 27 additionally as an armature. In that case, the diaphragm spring 27 is then advantageously made of cobalt iron, and to avoid magnetic seizing and to increase the wear resistance, the diaphragm spring 27 is coated with nickel. The cylindrical compression spring 33 for closing the seat valve 21 is omitted. The valve closing force is brought to bear by the diaphragm spring 27.

For use in supercharged engines, a shutoff or check valve 41 is necessary, the shutoff direction of which points from the outflow neck 12 toward the inflow neck 11. This check valve 41 is embodied directly on the intermediate ring 40 by conically widening the annular gap 23, on the back side of the intermediate ring 40 remote from the double valve seat 22, and on the back surrounding it coaxially on the inside and outside by a sealing seat 42. An annular closing element 43 is seated on the sealing seat 42. A restoring spring 44, which is supported on the closing element 43 and in the cup-shaped housing part 102, presses the closing element against the sealing seat 42.

Figure 4:
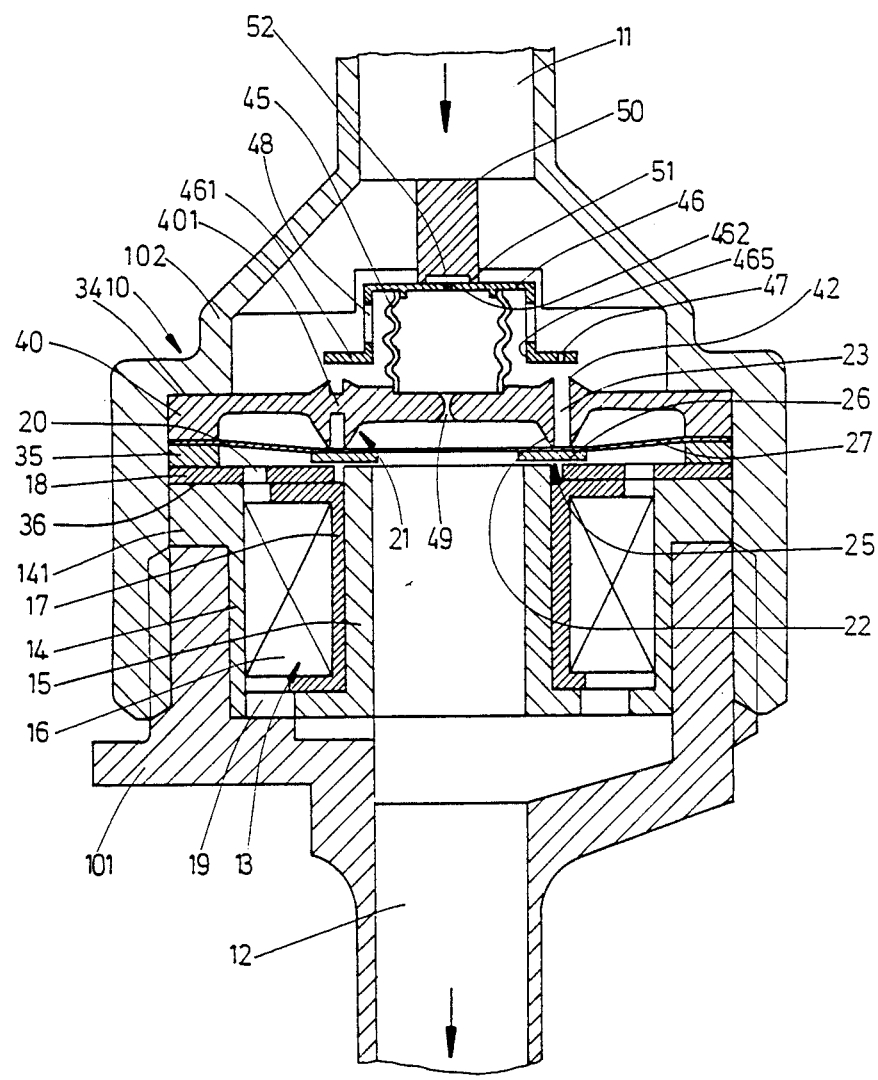
FIG. 4 is a longitudinal section through a tank bleeder valve in a third exemplary embodiment.

The further exemplary embodiment of a tank bleeder valve shown in FIG. 4 is largely identical to that of FIG. 3. The differences are as follows: The inflow neck 11 and outflow neck 12 change places—that is, the inflow neck 11 is disposed in the cup-shaped housing part 102, and the outflow neck 12 is disposed in the caplike housing part 101. The intermediate ring 40 is again fastened to the annular shoulder 34 in the cup-shaped housing part 102, so that its double valve seat 22 now faces toward the outflow neck 12. The flow direction is now in the opening direction of the valve element 25. On its front toward the inflow neck 11, the intermediate ring 40 has a sealing seat 42, coaxially surrounding the annular gap 23 on the inside and outside. In the inner region of the intermediate ring 40 surrounded by the sealing seat 42, a bellows 45 is secured in a pressure-tight manner with one face end on the front of the intermediate ring 40. The other face end of the metal bellows 45 is secured in pressure-tight fashion to the cup bottom 462 of a cup 46 that surrounds the bellows 45 with radial spacing and the cup rim of which merges integrally with an annular collar 461 protruding radially to beyond the annular gap 23. Bores 47 are distributed equidistantly in the annular collar 461 and in the axial direction are aligned with the annular gap 23. The wall 463 of the cup 45 is provided with openings 48. The annular collar 461 of the cup 46 forms a closing element, which cooperates with the sealing seat 42 on the intermediate ring, and when it rests on the sealing seat 42 it reduces the flow cross section of the seat valve 21 to the cross sections of the bores 47. Inside the region of the intermediate ring 40 surrounded by the bellows 45, there is a throttle bore 49, so that the interior of the bellows 45 communicates with the valve chamber located downstream of the double seat 42 of the seat valve 21. With this throttle bore 49, sufficiently great damping is attained that the bellows 45 will not vibrate to an impermissible extent during the adjustment.

With this additional group comprising the bellows 45, the cup 46 with its annular collar 461, and the sealing seat 42 disposed on the front of the intermediate ring 40, the opening cross section of the seat valve 21 in the clocking or indexing of the electromagnet 13 is additionally varied as a function of the differential pressure of the double seat 22 of the valve. If the negative pressure in the intake manifold rises, this compresses the bellows 45, so that the annular collar 461 moves closer to the sealing seat 42 and the flow cross section at the sealing seat 42 becomes smaller. The limit is reached when the cup 46 rests with its annular collar 461 on the sealing seat 42. The bores 47 then determine the maximum opening cross section of the seat valve 21. Versatile adaptation to requisite operating conditions is possible via the rigidity and stroke of the bellows 45 and via the diameter of the bores 47.

To eliminate tolerances in the spring characteristic of the bellows 45, a discontinuous adjustment of the bellows, instead of the continuous adjustment described above, is practical in certain applications. To accomplish this, a further sealing seat 51, on which the bottom 462 of the cup 46 rests, is provided on a stroke stop 50 disposed in the adjustment path of the bellows 45 or cup 46. The space inside the sealing edge of the sealing seat 51 communicates via a throttle 52 in the cup bottom 462 with the interior of the bellows 45 and hence is subjected to suction via the throttle bore 49. If the cup 46 rises from the sealing seat 51 when the switchover pressure difference is reached, then the entire cup bottom 462 is acted upon by the ambient pressure at the inflow neck 11. The cup 46 moves rapidly to the bottom terminal point, where the annular collar 461 is seated on the sealing seat 42. The cross section of the bores 47 again determines the flow cross section. In the opposite direction, that is, with a decreasing pressure difference at the seat valve 21, the same effect occurs in the reverse direction. As soon as the annular collar 461 lifts from the sealing seat 42, the full pressure difference no longer prevails at the bores 47 but instead decreases as a function of the open flow cross section. Because of the dropping differential pressure, the cup 46 moves rapidly upward until it rests on the stroke stop 50.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A valve for the metered admixture of fuel volatilized from the fuel tank of an internal combustion engines to a fuel-air mixture supplied to the engine via an intake manifold, comprising a valve housing having an inflow neck, for connection to a vent neck of a source of fuel vapor, an outflow neck for connection to the intake manifold having a seat valve, disposed in the interior of the valve housing between the inflow and outflow necks, a valve seat surrounding a valve opening and a valve element cooperating with the valve seat, the valve element being actuated by an electromagnet comprising a magnet cup, an exciter coil and an armature, said valve opening being embodied as an annular gap (23) valve element (25) is embodied in the form of an annular disk (26) of magnetically conductive material, which is loaded by a closing force which acts in the closing direction on the seat valve (21) and said disk forms the armature of the electromagnet (13).

2. A valve as defined by claim 1, in which the magnet cup (14) has an open top hollow-cylindrical cup core (15) coaxially offstanding from the cup bottom said cup core being covered by an intermediate disk (18), which rests on a rim of said cup and encloses the core (15) with radial spacing at its free end, and further that the disposition of the double valve seat (22) and annular disk (26) is arranged so that the annular disk spans the end face of the cup core (15) and the rim region of the intermediate disk (18).

3. A valve as defined by claim 1, in which the annular disk (26) is disposed on a diaphragm spring (27) fastened in the valve housing (10).

4. A valve as defined by claim 3, in which the closing force for the valve element (25) is brought to bear by the diaphragm spring (27), which is biased in the valve closing direction.

5. A valve as defined by claim 3, in which the closing force for the valve element (26) is brought to bear by a cylindrical compression spring (33) which loads the diaphragm spring (27), the compression spring (33) passing through the open space between the cup core (15) and the intermediate disk (18) and further being supported on the electromagnet (13), on a coil holder (17) which carries the exciter coil (16).

6. A valve as defined by claim 1, in which the valve housing (10) is embodied in two parts and has two housing parts (101, 102) mounted coaxially on one another, and further that the one housing part (101) has the inflow neck (11) and the other housing part (102) has the outflow neck (12) aligned coaxially with one another.

7. A valve as defined by claim 6, in which annular gap (23) having said double valve seat (22) is disposed coaxially with the inflow neck (11) in the housing part (101) having the inflow neck and is integral with this housing part, and further that the intermediate disk (18) which rests on the rim and the diaphragm spring (27) are firmly clamped between the two housing parts (101, 102), with the interposition of a spacer disk (35) that determines the stroke of the annular disk (26).

8. A valve as defined by claim 7, in which the rim of the magnet cup (14), has an annular flange (141) protruding outwardly, which is clamped between the housing parts (101, 102), together with the intermediate disk (18), the spacer disk (35) and the diaphragm spring (27).

9. A valve as defined by claim 7, in which the clamping is effected with the additional interposition of an elastic element (37), such as an O-ring, wave washer, or cup spring, which is supported between one of the two housing parts (101, 102) and said assembly further encapsulates the intermediate disk (18), spacer disk (35) and diaphragm spring (27) and optionally the annular flange (141) of the magnet cup (14).

10. A valve as defined by claim 7, in which the annular gap (23) is adapted to communicate with the inflow neck (11) via housing recesses (24), and further that openings (29, 30) for the flow cross section are provided in the diaphragm spring (27).

11. A valve as defined by claim 10, in which the diaphragm spring (27) has a circular opening (29) in the region of the cup core (15) and an annular opening (30), which is interrupted by resilient webs (32), in the region of the intermediate disk (18).

12. A valve as defined by claim 3, in which the annular disk (26) is disposed on the side of the diaphragm spring (27) remote from the double valve seat (22), and the diaphragm spring (27) is made from magnetically conductive material.

13. A valve as defined by claim 12, in which the diaphragm spring (27) and the annular disk (26) are embodied in one piece.

14. A valve as defined by claim 1, in which the annular gap (23) comprising the double valve seat (22) is disposed in an intermediate ring (40) retained in the valve housing (10), and further that the annular gap (23) is interrupted by webs (401), which connect the inner and outer parts of the intermediate ring (40) to one another.

15. A valve as defined by claim 14, in which the intermediate ring (40) together with the diaphragm spring (27), the spacer disk (35) and the intermediate disk (18) is fastened on the rim between the two housing parts (101, 102) of the valve housing (10).

16. A valve as defined by claim 15, in which the rim of the magnet cup (14) has an annular flange (141) which protrudes outwardly, and is clamped between the housing parts (101, 102), together with the intermediate disk (18), the spacer disk (35) and the diaphragm spring (27).

17. A valve as defined by claim 14, in which the intermediate ring (40) is disposed in the valve housing (10) so that the double valve seat (22) points toward the inflow neck (11). (FIG. 3)

18. A valve as defined by claim 17, in which the annular gap (23) communicates with an area which widens conically away from the double valve seat (22), of the intermediate ring (40) said widened area further adapted to engage a sealing seat (42), and that said sealing seat (42), under the influence of a restoring spring (44), provides an annular closing element (43) which forms a check valve (41).

19. A valve as defined by claim 14, in which the intermediate ring (40) is disposed on the valve housing (10) so that the double valve seat (22) points toward the outflow neck (12). (FIG. 4)

20. A valve as defined by claim 19, in which a bellows (45) is secured, in a pressure-tight manner with one face end remote from the double valve seat (22), and with its other face end proximate to cup 46 which includes a bottom (462) that surrounds the bellows (45) with radial spacing, said cup includes a rim which merges with an annular collar (461) that protrudes radially beyond said annular gap (23), and further that said intermediate ring (40) has a sealing seat (42) which surrounds the annular gap (23) coaxially said sealing seat further arranged to cooperate with the annular collar (461), to thereby provide a closing element, of the cup (46), and a throttle bore (49) in said intermediate surrounded by the bellows (45).

21. A valve as defined by claim 20, in which the annular collar (461) of the cup (46) further includes a number of axial bores (47) distributed in the circumferential direction, said bores being aligned with the annular gap (23) in the axial direction.

22. A valve as defined by claim 21, in which a stroke stop (50) is disposed in the displacement path of the cup (46), whereby when the seat valve (21) is closed, the cup (46) will rest thereagainst as a result of the restoring characteristic of the bellows (45).

23. A valve as defined by claim 22, in which the stroke stop (50) has a sealing seat (51), on which the bottom (462) of the cup (46) rests and further that a throttle (52) is provided in the cup bottom (462) inside the region covered by the sealing seat (51).

24. A valve as defined by claim 2, in which axial bores (19, 20) are provided in the cup bottom of the magnet cup (14) and in the opposed intermediate disk (18).

* * * * *